Patented Dec. 25, 1928.

1,696,815

UNITED STATES PATENT OFFICE.

ABRAM SMALL, OF DANVERS, MASSACHUSETTS.

PROCESS OF LEATHER FINISHING.

No Drawing.   Application filed November 30, 1926. Serial No. 151,828.

My invention relates to leather and to the process of finishing same. It is particularly applicable in the finishing of split and other leathers which have a rough surface or roughen in use.

My said invention has for its purpose to provide either a smooth or decorative film for leather surfacing: to provide a better wearing surface than has heretofore been possible; to eliminate cracking and the raising of the nap in use; to provide a novel mode of leather treatment; to produce a superior and more durable finish than has heretofore been possible; to transform and reduce to an improved merchantable product, inferior and rough leathers by a series of acts and operations performed upon the same; to produce a novel and improved finish with a novel solution substance and in certain ordered steps; to provide a new and novel method of procedure and mode of acting as a means for accomplishing useful and desired results; and to provide the various other advantages and results made evident from the following specification.

I accomplish the object of my invention in the order herein described and by the use of latex, or latex substitute, in conjunction with a water solution of shellac, waxes, soluble oils, casein albumens, and pigments, hereinafter referred to as a coating composition containing rubber latex, the novel ingredient of which is latex. The order of procedure followed is to first buff the leather to be finished until the rough nap thereon is rendered fine, a coat of the above described latex solution is then applied and allowed to thoroughly dry. The drying process normally requires about three hours, but the time varies in varying temperatures. A second coat of the same solution minus the latex is next applied and allowed to dry. When thoroughly dry a dusting of talc is added and the leather placed or submitted under high pressure at from 140° to 180° Fahrenheit.

In the foregoing description, the terms casein solution, shellac solution, wax solution, gum solution, and albumen solution are used in addition to the term latex. I have found it desirable to prepare these several solutions as follows:—casein solution; soak #1 casein in water, add 4 oz. borax, and boil for fifteen minutes, allow to cool and dilute to one gallon; shellac solution; boil #1 shellac with 4 oz. borax in water for ten minutes and dilute to one gallon; wax solution; boil #1 wax (carnauba) with soap and dilute to 1 gallon; gum tragacanth solution, soak #1 gum tragacanth in 1 gallon of water overnight and following morning boil and dilute to three gallons; albumen solution, dissolve #1 blood albumin or egg albumen in one gallon of water. A typical formula is a mixture of 1 part casein solution; 1 part shellac solution; $\frac{1}{10}$ part wax solution and 1 part albumen solution; pigments; and 1 part latex. Apply to the leather with 1 part gum solution to give the mixture body (on some leathers the addition of gum solution is not necessary); the omission of latex will cause the mixture to lose the property of laying down the nap which is the main object of the finish. Variations in the other parts will not materially affect the mixture and these may be changed to fit certain requirements in practice by one skilled in the art. When the leather has been treated with the mixture it is necessary to press it under the influence of heat; thus, in finishing a hot plate is used and applied under pressure to the leather after it has been treated. The addition of shellac solution to a latex solution gives a superior result owing to the flexibility of the latex finish slightly hardened by the shellac solution.

When applied and treated in the various steps and order named the finish is rendered soft and pliable, free from adhesive qualities, will not roughen or crack, and readily stands the tests applied to grain leathers. While I have described a preferred order for carrying my invention into effect, this is capable of variation or modification without departing from the spirit of the invention. I therefore do not wish to be limited to the exact details and steps herein set forth, but desire to avail myself of such variations and modifications as come within the scope of the appended claims. For instance a super-flexible finish is had by the coating of the latex solution alone, the other specified steps being followed with suitable temperatures and proper dusting or waxing. A varying number of coatings may be used to meet varying requirements.

Having thus described my invention I claim as new and desire to secure by Letters Patent of the United States of America:

1. The method of finishing leather, consisting in applying thereon a coating composition having latex as an ingredient to lay the nap, allowing the leather to dry, applying thereto said coating composition without latex as an ingredient, allowing the same to dry, dusting with finely comminuted matter, and finally placing the leather under high pressure between hot plates at a relatively high temperature.

2. The method of finishing leather, consisting in buffing the leather until all but the fine nap is removed, applying thereon a coating composition having latex as an ingredient thereof to lay the nap, allowing the leather to dry, applying thereto the coating composition without latex as an ingredient, allowing the same to dry, and finally placing the leather under relatively high pressure between hot plates and at a temperature of from 140° to 180° Fahrenheit.

In testimony whereof I affix my signature.

ABRAM SMALL.